US010704465B2

(12) United States Patent
Scharnhorst et al.

(10) Patent No.: US 10,704,465 B2
(45) Date of Patent: Jul. 7, 2020

(54) VARIABLE SUPERSONIC ENGINE INLET

(71) Applicant: The Boeing Company, Chicago, IL (US)

(72) Inventors: Richard K. Scharnhorst, Chesterfield, MO (US); Robert A. Olivo, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 869 days.

(21) Appl. No.: 14/553,171

(22) Filed: Nov. 25, 2014

(65) Prior Publication Data

US 2016/0146107 A1 May 26, 2016

(51) Int. Cl.
*F02C 7/00* (2006.01)
*F02C 7/057* (2006.01)
*F02C 7/042* (2006.01)

(52) U.S. Cl.
CPC .............. *F02C 7/057* (2013.01); *F02C 7/042* (2013.01); *F05D 2220/80* (2013.01)

(58) Field of Classification Search
CPC .. F02C 7/04; F02C 7/042; F02C 7/057; Y01T 137/0536; Y01T 137/0645; B64D 2033/026; B64D 2033/0273; B64D 2033/0286; F05D 2220/80
See application file for complete search history.

(56) References Cited

U.S. PATENT DOCUMENTS

| 4,291,533 | A | * | 9/1981 | Dugger | F02C 7/042 102/374 |
| 5,806,301 | A | * | 9/1998 | auBuchon | F01D 17/08 137/15.2 |
| 6,438,960 | B1 | * | 8/2002 | Jaw | F02C 7/04 60/726 |
| 8,359,825 | B2 | * | 1/2013 | Alvi | B64D 33/02 137/15.2 |
| 8,393,158 | B2 | * | 3/2013 | Conners | B64D 33/02 137/15.1 |
| 8,662,453 | B2 | * | 3/2014 | Richards | F01D 5/145 244/207 |
| 2009/0288711 | A1 | * | 11/2009 | Alvi | B64D 33/02 137/1 |
| 2010/0181436 | A1 | * | 7/2010 | Richards | F01D 5/145 244/53 B |

* cited by examiner

*Primary Examiner* — Todd E Manahan
*Assistant Examiner* — Edwin Kang
(74) *Attorney, Agent, or Firm* — Miller, Matthias & Hull LLP (57) ABSTRACT

Systems and methods for generating an oblique shock in a supersonic inlet are disclosed. The system can comprise an inlet with a slot disposed at an oblique angle to the main incoming air stream. High-pressure air can be provided through the slot into the main air stream. The high-pressure air can be introduced at a high enough pressure ratio—i.e., the ratio of pressure of the air stream from the slot to the pressure for the main flow—such that an aerodynamic ramp is created in the main air flow. The aerodynamic ramp, in turn, can cause one or more oblique shock waves to eventually slow the main air stream velocity to a subsonic speed prior to the face of the engine. Systems and methods for controlling the slot pressure ratio to create these shocks are also disclosed.

20 Claims, 10 Drawing Sheets

VARIABLE SUPERSONIC ENGINE INLET

FIELD

Embodiments of the present disclosure relate generally to supersonic inlets for external compression inlets and specifically to a supersonic inlet that uses high pressure air to create a variable ramp with no moving parts for use on supersonic aircraft.

BACKGROUND

Supersonic flight has been possible for more than 60 years, but is not without its challenges. One such challenge is the sonic "boom" caused on the ground as a supersonic aircraft flies over. Another challenge is that a majority of air-breathing jet engines (with the exception of scramjets) need subsonic flow through the engine to operate properly.

Most supersonic aircraft use some sort of variable inlet to create a shock system to provide subsonic flow to the engine. This shock system consists of a series of oblique shocks (not normal to the flow direction) followed by a normal shock (flow normal to the shock wave) that reduces the flow to subsonic speeds. Because supersonic aircraft must land and take off on normal runways, however, a large range of flights speeds is required. The aircraft may take off and land in the low subsonic speed range (150-220 mph), and yet cruise up to Mach 1.5 or 2.0 (1,000-1,500 mph). As a result, many aircraft use some sort of variable geometry inlet to maintain proper orientation of the shock system.

At subsonic flight speeds, for example, most inlet designs (cone, 2D ramps, etc.) operate much like a so-called "pitot" inlet in which flow is ingested without the presence of shock waves. As the vehicle goes supersonic, however, a shock wave appears, emanating from the cone or ramp. As flow passes through the shock wave, the Mach number decreases and flow is compressed. As the flight Mach number increases, however, the shock wave becomes more oblique (flattens) and eventually impinges on the cowl lip of the inlet. If the shock wave enters the inlet, flow quality is degraded to the point where the engine can stall (or "unstart").

For higher Mach numbers, therefore, one or more moving surfaces or so-called ramps becomes necessary to maintain the shockwave at or just outside the inlet cowl lip over a wide range of speeds. With increasing flight speed, for example, the ramps must be moved in order to maintain the shock system structure at the design condition of "shock-on-lip."

Unfortunately, due to the high pressure of supersonic flow, these variable inlet devices (e.g., cones or ramps) are subject to very high aerodynamic forces. To withstand these forces, provide the necessary responsiveness, and provide suitable service life, therefore, the variable inlet components tend to be heavy and complicated. This reduces overall aircraft efficiency, and increases production and maintenance costs.

What is needed, therefore, is a supersonic inlet with performance (flow quality) similar to what can be obtained with variable geometry but with few, or no, moving parts. The system should be simple, robust, responsive, and easy to maintain. It is to such systems and methods that embodiments of the present disclosure are primarily directed.

SUMMARY

It should be appreciated that this Summary is provided to introduce a selection of concepts in a simplified form that are further described below in the Detailed Description. This Summary is not intended to be used to limit the scope of the claimed subject matter.

Embodiments of the present disclosure relate to systems and methods for providing performance akin to a variable geometry supersonic inlet for use on supersonic aircraft. The system can utilize high pressure air, such as bleed air from the engine compressor stages, to create an oblique shock.

Embodiments of the present disclosure can include a variable supersonic inlet for an air-breathing engine comprising a duct, with a first end proximate a free stream air flow and a second end proximate a face of the air breathing engine, defining one or more slots disposed between the first end and the second end and a pressurized air source for expulsion through the one or more slots into the free stream air flow. In some embodiments, the pressurized air can create one or more oblique shock waves in the duct to slow the free stream airflow to a subsonic speed prior to the face of the air breathing engine.

Embodiments of the present disclosure can also include a method for decelerating a main air flow in a supersonic inlet of an air-breathing engine. In some embodiments, the method can include determining, with a processor, a minimum air pressure required to produce a minimum slot pressure ratio (SPR*), where SPR* denotes the minimum air pressure required in the slot to produce one or more oblique shock waves in the supersonic inlet, and providing high pressure air to a first end of a slot to generate one or more oblique shock waves in the supersonic inlet to decelerate the main air flow. In some embodiments, the slot can have a first end in fluid communication with a high pressure air source and a second end in fluid communication with the supersonic inlet.

Embodiments of the present disclosure can also include a non-transitory computer readable medium containing program instructions for causing a computer to perform a method of determining a first effective ramp angle ($\delta_{cruise}$), where the first effective ramp angle represents the sum of an aerodynamic turning angle and a slot angle, determining a first slot angle ($\delta_{scruise}$) for the slot at $M_{cruise}$. The method can also include determining a slot pressure ratio ($SPR_{cruise}$) at which (1) one or more oblique shock waves will form in the duct, and (2) a Mach number of an air flow in the duct after the one or more oblique shock waves ($M_1$) is approximately equal to the Mach number of the flow in the slot ($M_s$).

The features, functions, and advantages that have been discussed can be achieved independently in various embodiments of the present disclosure or may be combined in yet other embodiments, further details of which can be seen with reference to the following description and drawings.

Each figure shown in this disclosure shows a variation of an aspect of the embodiment presented, and only differences will be discussed in detail.

DETAILED DESCRIPTION

Embodiments of the present disclosure relate generally to supersonic inlet design, and specifically to a supersonic inlet utilizing high pressure air injected into the air stream to create an oblique shock. In some embodiments, the system can comprise a fixed slot, located in the inlet, to inject relatively high pressure air into the inlet air stream at a fixed angle. Rather than relying on expensive and heavy mechanisms, such as moveable planes or cones, the system can provide the necessary flow diffusion with little or no moving parts.

To simplify and clarify explanation, the disclosure is described herein as a system and method for generating an oblique shock in a supersonic inlet using injected air. One skilled in the art will recognize, however, that the disclosure is not so limited. The system can also be used, for example and not limitation, with other types of supersonic, air breathing engines. In addition, the disclosure provided below is related to supersonic aircraft, yet is equally applicable to other types of currently known vehicles (e.g., supersonic land vehicles) and equivalently related supersonic vehicles developed after this disclosure. One example of known supersonic land vehicles is the Thrust SSC (Supersonic Car) developed by Richard Noble, Glynne Bowsher, Ron Ayers, and Jeremy Bliss, which was the first car to break the sound barrier. See, Richard Noble, Thrust: The Remarkable Story of One Man's Quest for Speed, Partridge (1998). It should be noted that, while the term "inlet" is used herein to describe the orifice, duct, passageway, or other structure used to bring free stream air into the engine, other equivalent terms such as, for example, "intake" could also be used.

The materials described hereinafter as making up the various elements of the present disclosure are intended to be illustrative and not restrictive. Many suitable materials that would perform the same or a similar function as the materials described herein are intended to be embraced within the scope of the disclosure. Such other materials not described herein can include, but are not limited to, materials that are developed after the time of the development of the disclosure.

As mentioned above, conventional supersonic aircraft tend to use relatively heavy mechanically adjustable variable inlets. These systems use moveable ramps or cones, for example, to move an oblique shock in an out of the inlet to adapt to different flight speeds, temperature, and densities, among other things. Due to the high forces involved, however, these systems tend to be very heavy and can be complicated to build and use. Many systems are computer controlled to prevent the shock wave from entering the inlet altogether, which can cause an engine "unstart," or stall.

Figure 1:
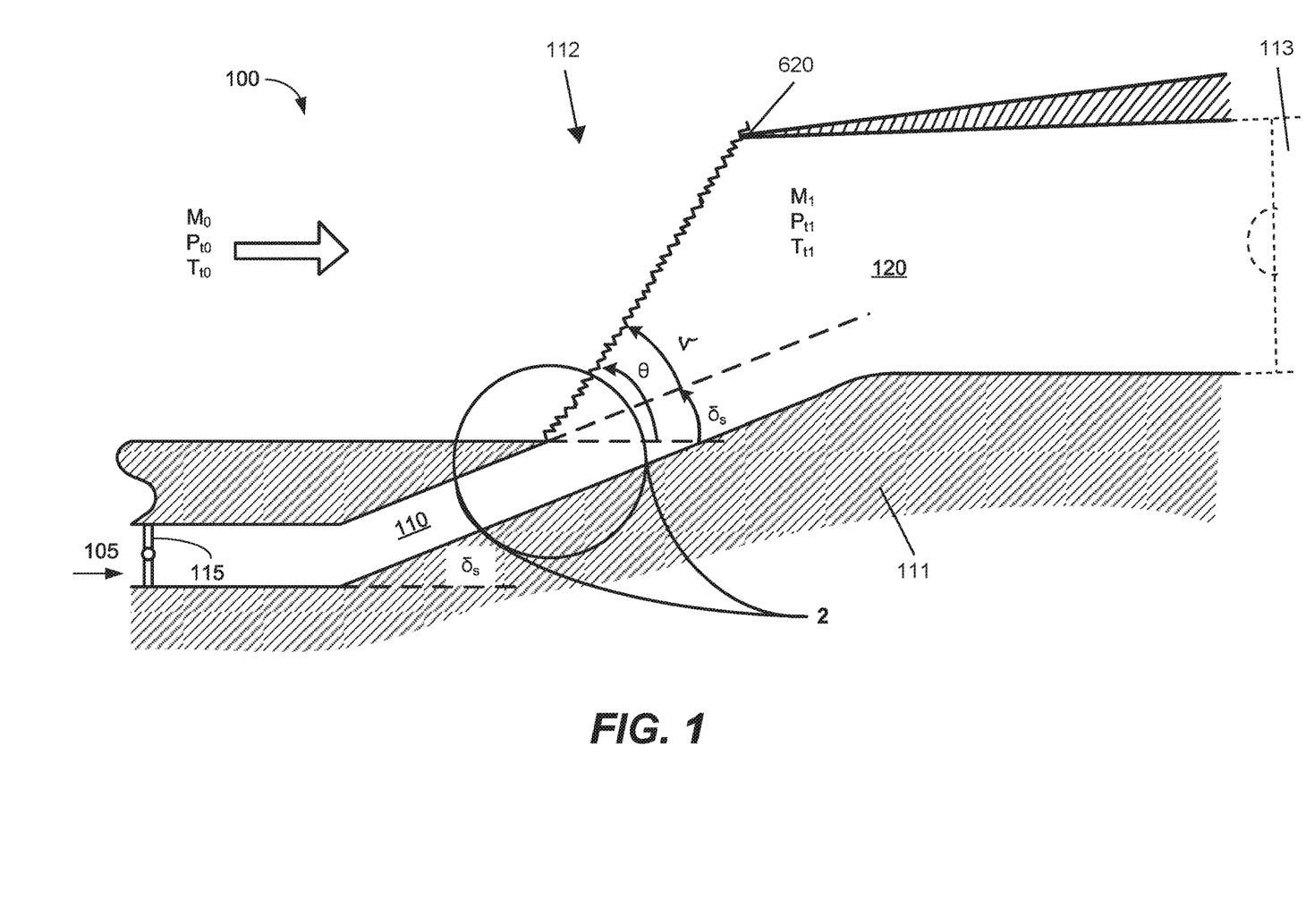
FIG. 1 is a partial, cutaway view of a supersonic inlet with a slot, in accordance with some embodiments of the present disclosure.

To this end, embodiments of the present disclosure relate to systems and methods for injecting high pressure air into a supersonic flow to create an adjustable oblique shock wave. As shown in FIG. 1, the system 100 can comprise a high pressure air source 105 and an angled slot 110 located in a surface 111 of an inlet 112 for a jet engine 113. The air injected by the system 100 can act as an aerodynamic ramp to create an oblique shock wave in the duct 120 of the inlet. This can enable the flow to slow to subsonic speeds for use by the engine 113.

The air source 105 can be provided by, for example, the compressor side of the engine 113 (i.e., "bleed air"). In most cases, the pressure required for the system 100 can be obtained from the first stage compressor fan section. Obviously, higher pressures are available from later stages and could be used if necessary. As discussed below, the air source 105 can be controlled by an electronic air supply valve 115 that can vary the pressure of the air source 105 and thus, the ratio of pressure from the air source 105 to the main air stream pressure in the duct 120 based on current conditions. This ratio of slot pressure/main flow pressure can be called the slot pressure ratio (SPR). In some embodiments, the air supply valve 115 can comprise many types of pneumatic valves including, for example and not limitation, poppet valves, gate valves, and solenoids.

As discussed below, the angle of the slot $\delta_s$ can be fixed or variable. In some embodiments, the slot angle $\delta_s$ can be fixed and can be chosen based on, for example, design cruise speed, maximum speed, or a compromise between the two. For a supersonic airliner, for example, which spends a vast majority of time at supercruise (e.g., Mach 1.6), the slot angle $\delta_s$ can be chosen at this Mach number. Fighter aircraft, on the other hand, which tend to operate over wider ranges of speed, may adopt a compromised or variable slot design. Relatively high pressure air 105 can be injected into the supersonic air stream at an angle, $\delta$, with a Mach number, $M_0$, and total conditions, $P_{ts}$ and $T_{ts}$. The injected air 105 causes a shock in the free stream air flow in the duct 120. The shock wave angle, $\theta$, can be set by matching static pressures between the injected 105 air and the supersonic air stream.

For a given aerodynamic ramp angle, $\delta$, for example, the static pressure downstream of the oblique shock can be calculated from the following:

$$\cot\delta = \tan\theta \left[ \frac{(\gamma+1)M_0^2}{2(M_0^2\sin^2\theta - 1)} - 1 \right] \qquad (1)$$

$$\sin\theta = \sqrt{\frac{1 + \left[\frac{1}{2}(\gamma+1)M_0^2 + 1\right]\tan\delta\tan\theta}{M_1^2(1 + \tan\delta\tan\theta)}}$$

The shock wave angle, $\theta$, can then be calculated iteratively from (1) with an initial guess computed from the Mach wave angle:

$$\theta_1 = \sin^{-1}\frac{1}{M_0} \qquad (2)$$

The downstream Mach number, $M_1$, can be calculated from:

$$M_1 = \sqrt{\frac{(\gamma-1)M_0^2\sin^2\theta + 2}{\sin^2(\theta-\delta)[2\gamma M_0^2\sin^2\theta - (\gamma-1)]}} \quad (3)$$

And the downstream total pressure from:

$$\frac{P_{t_1}}{P_{t_0}}\left[\frac{(\gamma+1 M_0^2\sin^2\theta}{(\gamma-1)M_0^2\sin^2\theta + 2}\right]^{\frac{\gamma}{\gamma-1}}\left[\frac{\gamma+1}{2\gamma M_0^2\sin^2\theta - (\gamma-1)}\right]^{\frac{1}{\gamma-1}} \quad (4)$$

The downstream static pressure can be calculated from the standard isentropic relation:

$$\frac{P_1}{P_{t_1}} = \left(1 + \frac{\gamma-1}{2}M_1^2\right)^{-\frac{\gamma}{\gamma-1}} \quad (5)$$

or in terms of the upstream properties:

$$\frac{P_1}{P_{t_0}} = \frac{2\gamma M_0^2\sin^2\theta - (\gamma-1)}{\gamma+1}\left[\frac{2}{(\gamma-1)M_0^2 + 2}\right]^{\frac{\gamma}{\gamma-1}} \quad (6)$$

$$\frac{P_1}{P_{t_0}} = \left(1 + \frac{\gamma-1}{2}M_0^2\right)^{-\frac{\gamma}{\gamma-1}}\left[\frac{2\gamma M_0^2\sin^2\theta - (\gamma-1)}{\gamma+1}\right]$$

$$\frac{P_1}{P_0} = \frac{2\gamma M_0^2\sin^2\theta - (\gamma-1)}{\gamma+1} \quad (7)$$

For a sufficiently high pressure ratio, the slot will be choked at the exit. As a result, the static pressure can be given by:

$$\frac{P_s}{P_{ts}} = \left(\frac{\gamma+1}{2}\right)^{-\frac{\gamma}{\gamma-1}} \quad (8)$$

In terms of a "nozzle" pressure ratio relative to the upstream static pressure:

$$SPR^* = \frac{P_{ts}}{P_0} = \frac{P_{ts}}{P_1}\frac{P_1}{P_0}$$

but from (7), assuming ideal expansion (i.e., $P_1 = P_s$):

$$SPR^* = \left(\frac{\gamma+1}{2}\right)^{-\frac{\gamma}{\gamma-1}}\left[\frac{2\gamma M_0^2\sin^2\theta - (\gamma-1)}{\gamma+1}\right] \quad (9)$$

Thus, this represents the minimum slot total pressure ratio (SPR*) for ideal expansion (i.e., expansion will occur through a Prandtl-Meyer expansion fan at any slot pressure greater than SPR*). The flow behind the oblique shock, therefore, acts as though a ramp, with a ramp angle of δ, is in the flow. Thus, variable supersonic inlet can be created using an aerodynamic "ramp," as opposed to a physical one, with no moving parts. In some embodiments, the ramp can be adjusted for different conditions by varying the pressure ratio of the injected air.

Example 1

Figure 2:
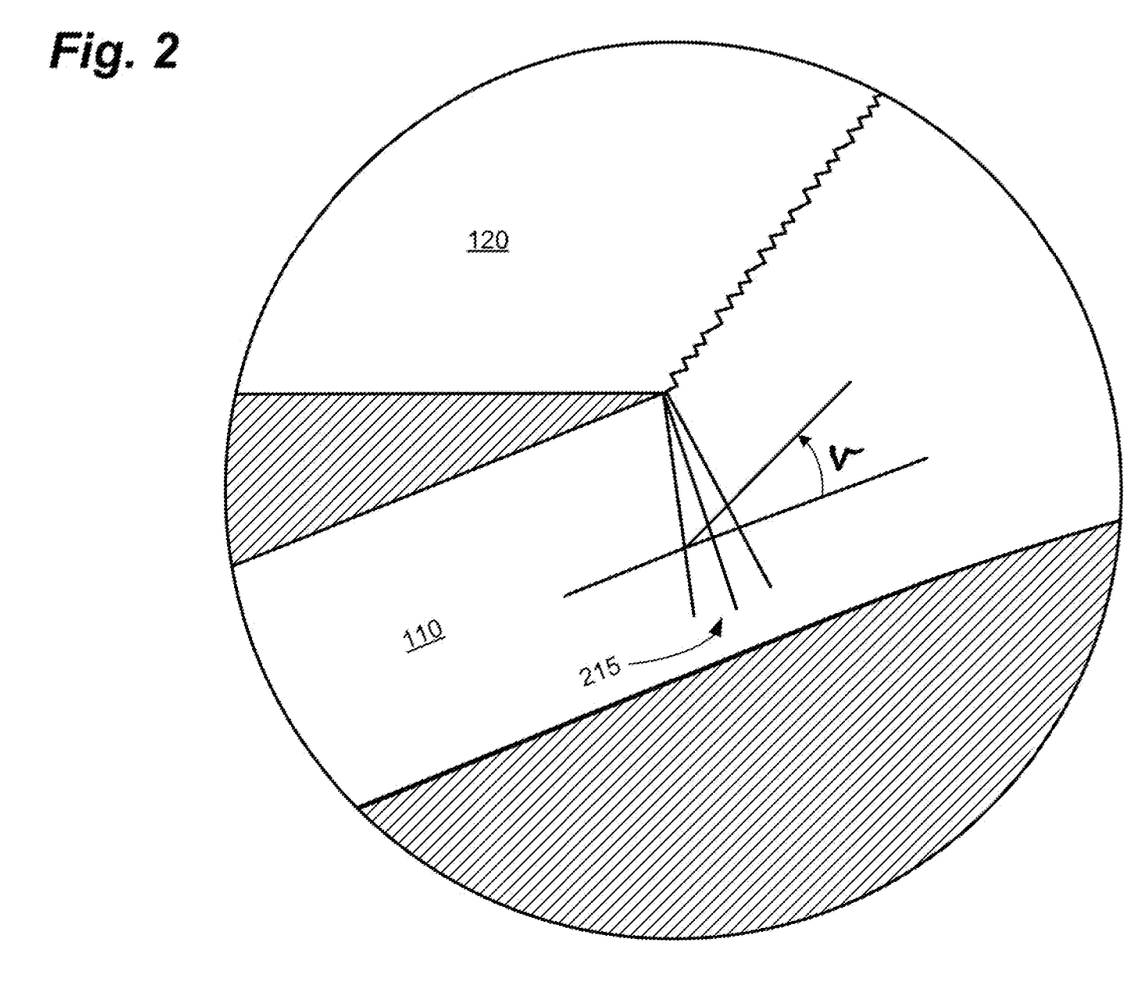
FIG. 2 is a detailed view of the supersonic inlet of FIG. 1, in accordance with some embodiments of the present disclosure.

As a specific example, assume that $M_0=1.8$, $\delta_s=\delta=11°$. Using the equations above, $\theta=45.33449°$, $M_1=1.4116$, and $P_{t1}/P_{to}=0.98265$. Then using equation (9), SPR=3.3039. Thus, for SPRs greater than 3.3039, the effective aerodynamic ramp angle, δ, is greater than the slot angle, $\delta_s$, and vice-versa allowing the orientation of the shock to be pivoted between the slot angle, $\delta_s$, and a more vertical (less oblique to the flow) position. To analyze these conditions, the flow near the slot where the oblique shock is formed can be analyzed, as shown in FIG. 2. Locally, the flow in the slot will expand or compress to match the pressure field. When SPR>SPR* (indicating ideal expansion), therefore, expansion will occur through a Prandtl-Meyer expansion fan 215. The turning angle, ν, of the flow is set by matching the static pressure (i.e., $P_1=P_s$). But the exit pressure can be given by:

$$\frac{P_s}{P_{ts}} = \left(1 + \frac{\gamma-1}{2}M_s^2\right)^{-\frac{\gamma}{\gamma-1}} \quad (10)$$

and the relation between the Prandtl-Meyer turning angle and the final Mach number can be given by:

$$\nu = \sqrt{\frac{\gamma+1}{\gamma-1}}\tan^{-1}\sqrt{\frac{\gamma-1}{\gamma+1}(M_s^2-1)} - \tan^{-1}\sqrt{M_s^2-1} \quad (11)$$

Thus for a given SPR:

$$SPR = \frac{P_{ts}}{P_0} = \frac{P_{ts}}{P_1}\frac{P_1}{P_0} = \frac{P_{ts}}{P_s}\frac{P_1}{P_0} \quad (12)$$

$$SPR = \left(1 + \frac{\gamma-1}{2}M_s^2\right)^{\frac{\gamma}{\gamma-1}}\left[\frac{2\gamma M_0^2\sin^2\theta - (\gamma-1)}{\gamma+1}\right]$$

$$\left(1 + \frac{\gamma-1}{2}M_s^2\right)^{\frac{\gamma}{\gamma-1}}\left[\frac{\gamma+1}{2\gamma M_0^2\sin^2\theta - (\gamma-1)}\right]SPR$$

$$M_s = \sqrt{\frac{2}{\gamma-1}\left[\frac{(\gamma+1)SPR}{2\gamma M_0^2\sin^2\theta - (\gamma-1)}\right]^{\frac{\gamma-1}{\gamma}} - 1}$$

Then the following set of three equations (collectively, equation (13)) can be used to solve for the flow field properties:

$$M_s = \sqrt{\frac{2}{\gamma-1}\left\{\left[\frac{(\gamma+1)SPR}{2\gamma M_0^2\sin^2\theta - (\gamma-1)}\right]^{\frac{\gamma-1}{\gamma}} - 1\right\}}$$

$$\delta = \delta_s + \sqrt{\frac{\gamma+1}{\gamma-1}}\tan^{-1}\sqrt{\frac{\gamma-1}{\gamma+1}(M_s^2-1)} - \tan^{-1}\sqrt{M_s^2-1}$$

$$\theta = \sin^{-1}\sqrt{\frac{1 + \left(1 + \frac{\gamma+1}{2}M_0^2\tan\delta\tan\theta\right)}{M_0^2(1+\tan\delta\tan\theta)}}$$

A practical limit on SPR exists, however, above which the flow field properties cannot be determined using these equations. For a given upstream Mach number, $M_0$, the shock wave angle, $\delta_{max}$, for maximum stream deflection can be given by the following two equations (collectively, equation (14)):

$$\sin^2\theta_{\delta_{max}} = \frac{1}{4\gamma M_0^2}\left\{(\gamma+1)M_0^2 - 4 + \sqrt{(\gamma+1)[(\gamma+1)M_0^4 + 8(\gamma-1)M_0^2 + 16]}\right\}$$

$$\delta_{max} = \cot^{-1}\left\{\tan\theta_{\delta_{max}}\left[\frac{(\gamma+1)M_0^2}{2(M_0^2\sin^2\theta_{\delta_{max}} - 1)} - 1\right]\right\}$$

and the maximum turning angle, $\nu_{max}$, can be given by:

$$\nu_{max} = \delta_{max} - \delta_s \quad (15)$$

which sets $M_{s_{max}}$. Thus, the maximum SPR can then be calculated from:

$$SPR_{max} = \left(1 + \frac{\gamma-1}{2}M_{s_{max}}^2\right)^{\frac{\gamma}{\gamma-1}}\left[\frac{2\gamma M_0^2 \sin\theta_{\delta_{max}} - (\gamma-1)}{(\gamma+1)}\right] \quad (16)$$

Above $SPR_{max}$ the shock will detach and act like a normal shock wave (i.e., a strong oblique shock wave). As a result, the three equations (13) can be modified for $SPR_{max} > SPR > SPR^*$. Thus, the range of SPRs can be found that range from the minimum pressure for ideal expansion ($SPR^*$) to the maximum pressure that can be calculated ($SPR_{max}$), thus providing an operating range for the system.

Example 2

Again, assume that the free stream air flow is at $M_0=1.8$, $\delta_s=\delta=11°$. Using the equations above, $\theta_{max}=64.9872°$, $\delta_{max}=19.183°$, $\nu_{max}=8.183°$, and $M_s=1.37195$. Using this data, $SPR_{max}=8.9877$. Thus, if the SPR is larger than this value, the shock will detach and act like a normal shock wave. Additional results are summarized in Table 1 for a range of $SPR < SPR_{max}$:

TABLE 1

| SPR (—) | θ (degrees) | δ (degrees) | $M_1$ (—) | Recovery (—) | $M_s$ (—) |
|---|---|---|---|---|---|
| 2 | — | — | — | — | — |
| 3.35 | 45.39 | 11.04 | 1.4099 | 0.9389 | 1.0099 |
| 3.5 | 45.74 | 11.30 | 1.3999 | 0.9402 | 1.0361 |
| 3.75 | 46.44 | 11.83 | 1.3795 | 0.9425 | 1.0717 |
| 4.0 | 47.21 | 12.37 | 1.3576 | 0.9444 | 1.1019 |
| 4.25 | 48.0 | 12.92 | 1.3355 | 0.9458 | 1.1285 |
| 4.5 | 48.79 | 13.44 | 1.3135 | 0.9465 | 1.1527 |
| 4.75 | 49.58 | 13.95 | 1.2918 | 0.9467 | 1.1747 |
| 5.0 | 50.37 | 14.43 | 1.2704 | 0.9463 | 1.1949 |
| 5.25 | 51.16 | 14.90 | 1.2492 | 0.9454 | 1.2137 |
| 5.5 | 51.95 | 15.34 | 1.2284 | 0.9440 | 1.2311 |
| 6.0 | 53.52 | 16.16 | 1.1874 | 0.9398 | 1.2627 |
| 6.5 | 55.12 | 16.90 | 1.1470 | 0.9341 | 1.2903 |
| 7.0 | 56.75 | 17.57 | 1.1066 | 0.9269 | 1.3144 |
| 7.5 | 58.46 | 18.15 | 1.0654 | 0.9183 | 1.3353 |
| 8.0 | 60.30 | 18.64 | 1.0224 | 0.9084 | 1.3527 |
| 8.35 | 61.73 | 18.91 | 0.9901 | 0.9006 | 1.3625 |
| 8.9 | 64.99 | 19.19 | 0.8841 | 0.8841 | 1.3720 |

Figure 3:
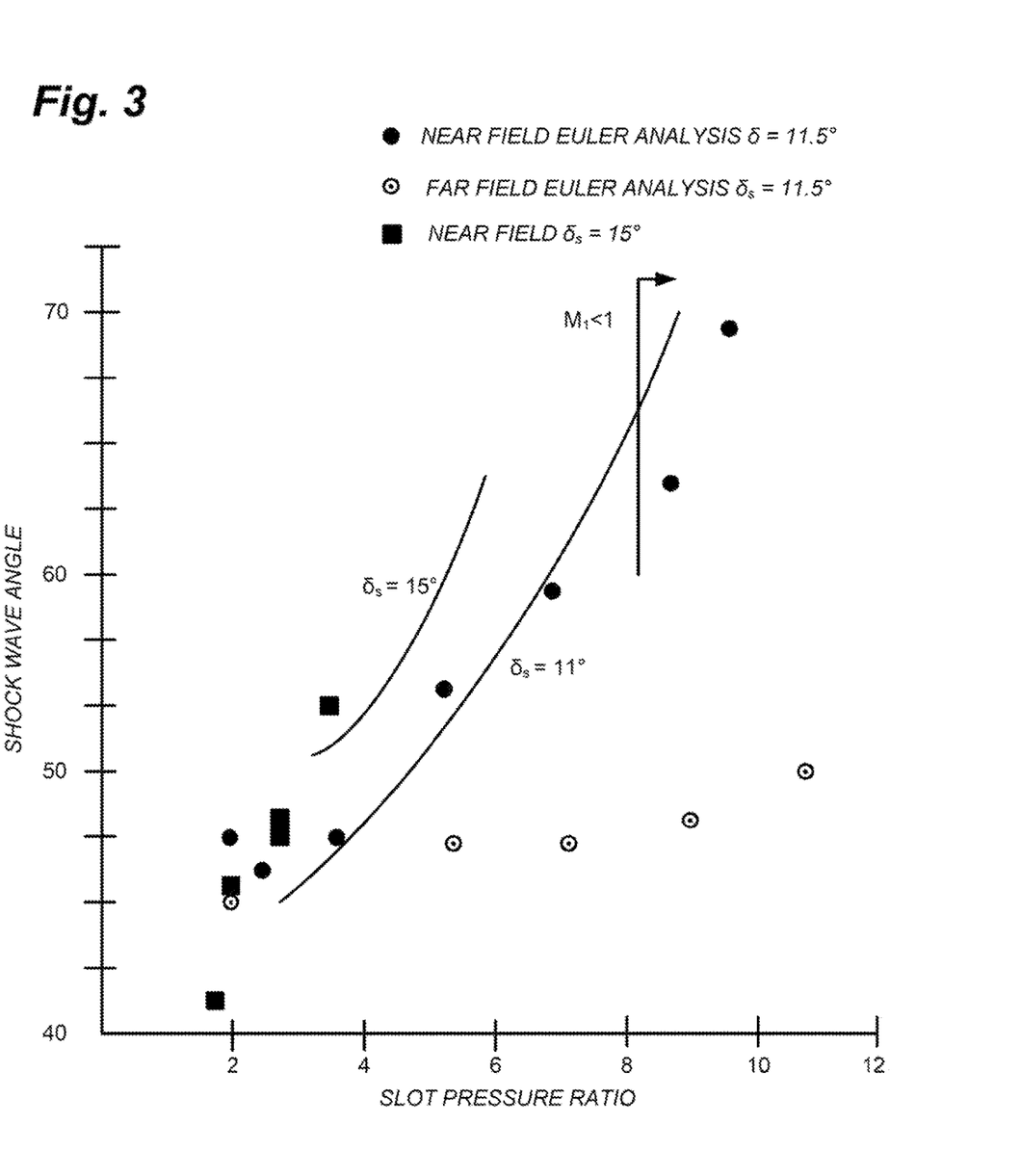
FIG. 3 is a graph comparing slot pressure ratio (SPR) and shock wave angle, in accordance with some embodiments of the present disclosure.

As used above, Recovery includes an overall system recovery (i.e., oblique recovery+normal recovery at $M_1$). These calculated results for shock wave angle, θ, and SPR can be compared to predictions from a computational fluid dynamics (CFD) computer program that compute flows in the absence of friction. These comparisons are shown in FIG. 3. Note that, at this point, not all values can be calculated. This is due to numerical difficulties associated with computing θ and for solving for Mach number at a given fan angle, ν. Additional analysis is required, as discussed below.

The Prandtl-Meyer fan angle can be computed from:

$$\nu(M) = \sqrt{\frac{\gamma+1}{\gamma-1}}\tan^{-1}\sqrt{\frac{\gamma-1}{\gamma+1}(M^2-1)} - \tan^{-1}\sqrt{M^2-1} \quad (17)$$

In order to solve for the Mach number for a given Prandtl-Meyer angle, $\nu_0$, the function to zero is:

$$f(M) = \nu_0 - \nu(M) \quad (18)$$

and the Newton-Raphson methodology is:

$$M_2 = M_1 - \frac{f(M_1)}{f'(M_1)} \quad (19)$$

Thus:

$$f'(M) = -\sqrt{\frac{\gamma+1}{\gamma-1}}\left\{\frac{d}{dM}\left[\tan^{-1}\sqrt{\frac{\gamma-1}{\gamma+1}(M^2-1)}\right]\right\} + \frac{d}{dM}\left[\tan^{-1}\sqrt{M^2-1}\right]$$

But:

$$\frac{d}{dM}\left[\tan^{-1}\sqrt{\frac{\gamma-1}{\gamma+1}(M^2-1)}\right] = \frac{d}{dx}\tan^{-1}\left(\frac{x-a}{\omega}\right)\frac{dx}{dM} = \frac{\omega}{(x-a)^2+\omega^2}\frac{dx}{dM}$$

where:

$$\omega = \sqrt{\frac{\gamma+1}{\gamma-1}}$$
$$x = \sqrt{M^2-1}$$
$$a = 0$$
$$\frac{dx}{dM} = \frac{1}{2}\frac{2M}{\sqrt{M^2-1}}$$

Thus:

$$\frac{\omega}{(x-a)^2+\omega^2}\frac{dx}{dM} = \frac{\sqrt{\frac{\gamma+1}{\gamma-1}}}{M^2-1+\left(\frac{\gamma+1}{\gamma-1}\right)}\frac{M}{\sqrt{M^2-1}}$$

$$= \frac{\sqrt{(\gamma+1)(\gamma-1)}}{(\gamma-1)M^2-\gamma+1+\gamma+1}\frac{M}{\sqrt{M^2-1}}$$

$$= \frac{\sqrt{(\gamma+1)(\gamma-1)}}{2+(\gamma-1)M^2}\frac{M}{\sqrt{M^2-1}}$$

-continued $$\frac{d}{dM}(\tan^{-1}\sqrt{M^2-1}) = \frac{1}{M^2-1+1}\frac{M}{\sqrt{M^2-1}} = \frac{1}{M\sqrt{M^2-1}}$$

where:
$\omega = 1$
$a = 0$
$x = \sqrt{M^2-1}$
therefore:

$$f'(M) = -\sqrt{\frac{\gamma+1}{\gamma-1}}\frac{\sqrt{(\gamma+1)(\gamma-1)}}{2+(\gamma-1)M^2}\frac{M}{\sqrt{M^2-1}} + \frac{1}{M\sqrt{M^2-1}}$$

$$= \frac{1}{\sqrt{M^2-1}}\left[\frac{1}{M} - \frac{(\gamma+1)M}{2+(\gamma-1)M^2}\right]$$

$$= \frac{1}{\sqrt{M^2-1}}\left[\frac{2+(\gamma-1)M^2-(\gamma+1)M^2}{M[2+(\gamma-1)M^2]}\right]$$

$$\frac{1}{\sqrt{M^2-1}}\left[\frac{2(1-M^2)}{M[2+(\gamma-1)M^2]}\right]$$

$$f'(M) = -\frac{2\sqrt{M^2-1}}{M[2+(\gamma-1)M^2]}$$

therefore, (19) becomes:

$$M_2 = M_1 + \frac{M_1[2+(\gamma-1)M_1^2][\nu_0 - \nu(M_1)]}{2\sqrt{M_1^2-1}} \quad (20)$$

Figure 4A:
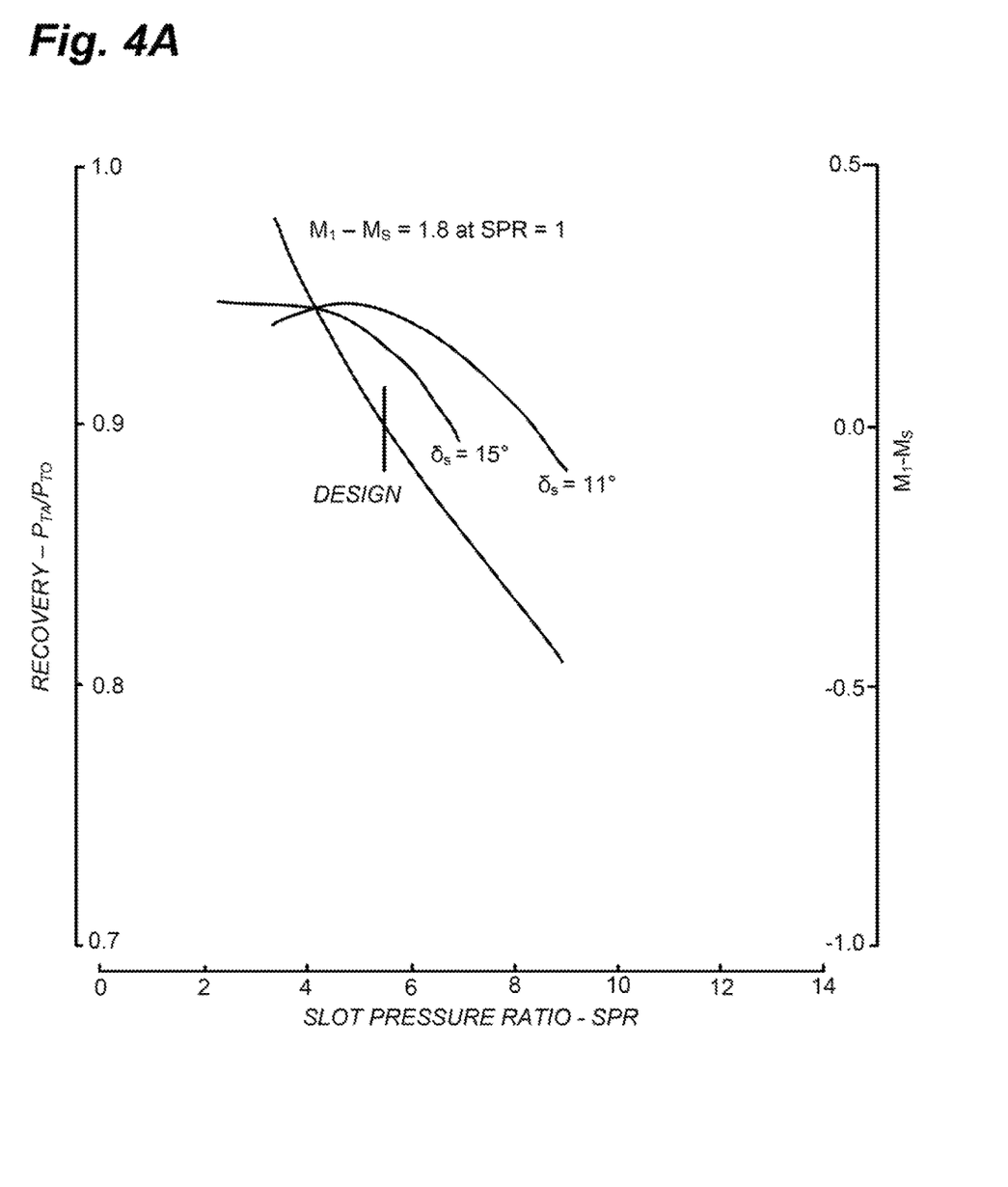
FIG. 4A is a graph comparing SPR and pressure recovery, in accordance with some embodiments of the present disclosure.

Thus, using Equation (20), and setting $\delta = \delta_{max}$ as an upper limit for $\delta$ enables the remainder of Table 1 to be calculated. Note that some solutions are possible for M<1 and that the CFD solutions also include solutions for M<1. Intuitively, this makes sense as this could occur for sufficiently high SPRs. Also note that the maximum recovery occurs for conditions where $M_s = M_1$. The variation in recovery with varying SPR is shown in FIG. 4A. Analytically, this can be shown by:

$$M_s = M_1 \quad (21)$$

$$\sqrt{\frac{2}{\gamma-1}\left\{\left[\frac{(\gamma+1)SPR_{DES}}{2\gamma M_0^2\sin^2\theta - (\gamma-1)}\right]^{\frac{\gamma-1}{\gamma}} - 1\right\}} =$$

$$\sqrt{\frac{(\gamma-1)M_0^2\sin^2\theta+2}{2\gamma M_0^2\sin^2\theta - (\gamma-1)}}\left(\frac{1}{\sin(\theta-\delta)}\right)$$

$$\frac{(\gamma+1)SPR_{DES}}{2\gamma M_0^2\sin^2\theta - (\gamma-1)} =$$

$$\left[\frac{\gamma-1}{2}\frac{1}{\sin^2(\theta-\delta)}\frac{(\gamma-1)M_0^2\sin^2\theta+2}{2\gamma M_0^2\sin^2\theta - (\gamma-1)}+1\right]^{\frac{\gamma}{\gamma-1}}$$

$$SPR_{DES} =$$

$$\left(2\frac{\gamma}{\gamma+1}M_0^2\sin^2\theta - \frac{\gamma-1}{\gamma+1}\right)\left[\frac{(\gamma-1)[(\gamma-1)M_0^2\sin^2\theta+2]}{2\sin^2(\theta-\delta)\left[\frac{2\gamma M_0^2\sin^2\theta-}{(\gamma-1)}\right]}+1\right]^{\frac{\gamma}{\gamma-1}}$$

Equation (21) can be used in conjunction with equation (13) to set $SPR_{des}$ such that the slot flow pressure and Mach number are matched.

Example 4

Figure 4B:
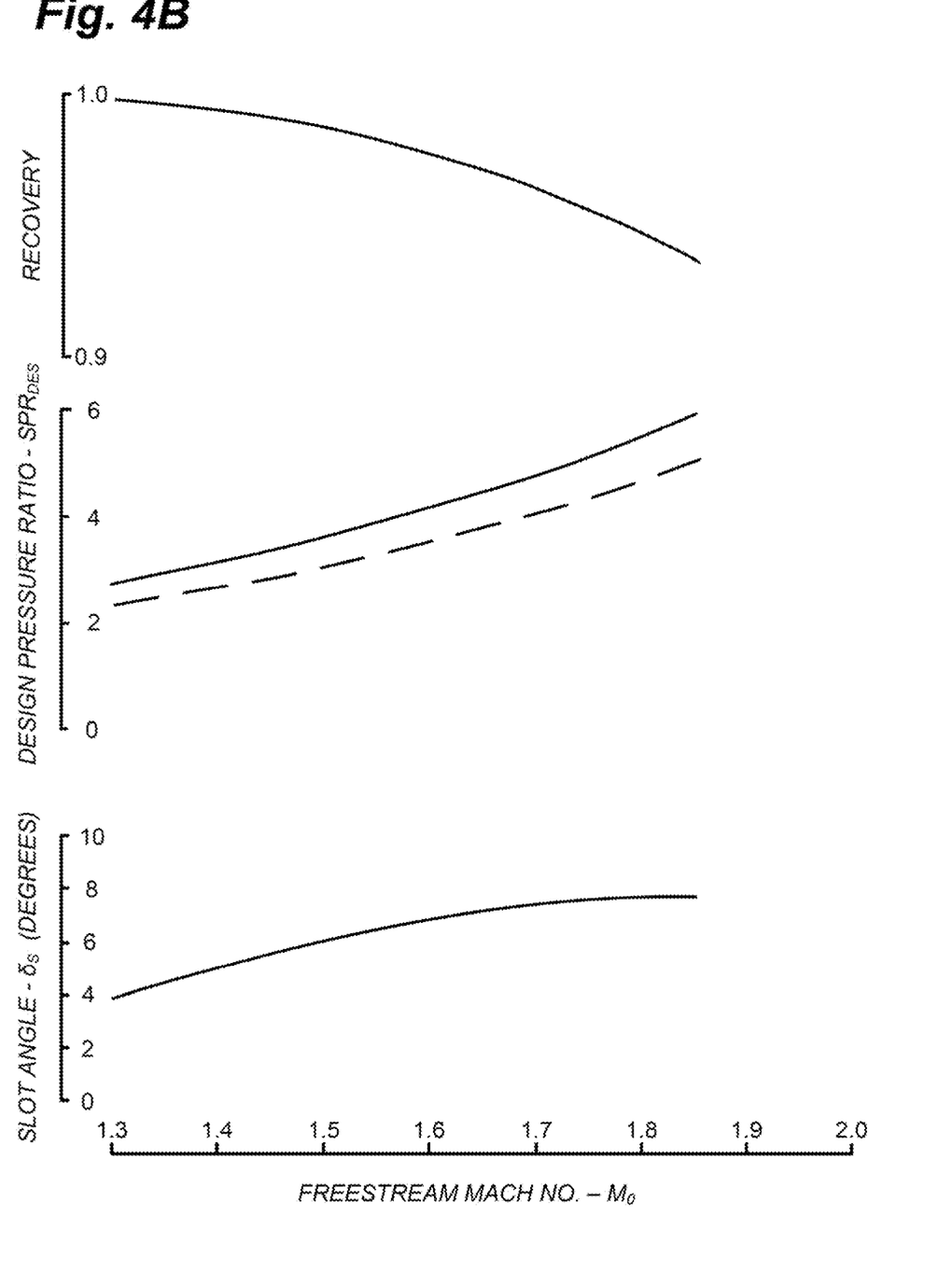
FIG. 4B is a graph showing optimized designs at various free air stream Mach numbers, in accordance with some embodiments of the present disclosure.

To analyze a specific case, $SPR_{des}$ can be set to 5.481728. At this SPR, no shear layer is set up between the slot flow and the flow behind the oblique shock (i.e., $M_s = M_1$). This is desirable from an inlet stability standpoint, but results in a slight decrease in recovery (~0.25%) from the peak value. Embodiments of the present disclosure, however, can enable $M_0$ and $\delta_s$ to be set such that optimum recovery occurs at $SPR_{des}$. This can be done analytically using the equations presented. Results are shown below in Table 2 and plotted in FIG. 4B:

TABLE 2

| $M_0$ (—) | $\delta_{opt}$ (degrees) | Recovery (—) | $\delta_s$ (degrees) | $SPR_{DES}$ (—) |
|---|---|---|---|---|
| 1.3 | 5.0 | 0.9972 | 3.85 | 2.7651 |
| 1.35 | 6.0 | 0.9955 | 4.89 | 2.9582 |
| 1.4 | 7.0 | 0.9932 | 5.10 | 3.1627 |
| 1.45 | 7.9 | 0.9902 | 5.50 | 3.3941 |
| 1.5 | 8.9 | 0.9865 | 6.10 | 3.6378 |
| 1.55 | 9.8 | 0.9820 | 6.50 | 3.9018 |
| 1.6 | 10.7 | 0.9767 | 6.91 | 4.1855 |
| 1.65 | 11.5 | 0.9705 | 7.12 | 4.4922 |
| 1.7 | 12.3 | 0.9635 | 7.35 | 4.8211 |
| 1.75 | 13.1 | 0.9555 | 7.61 | 5.1729 |
| 1.8 | 13.8 | 0.9467 | 7.68 | 5.5529 |
| 1.85 | 14.5 | 0.9370 | 7.78 | 5.9575 |

Thus, for a given $M_0$, the effective ramp angle can be set to opt, the effective ramp angle at which recovery is maximized, and both $\delta_s$ and $SPR_{des}$ can be determined.

Example 5

For a specific example, $M_0 = 1.8$ and $\delta_{opt} = 13.8°$:

$\therefore \delta_{eff} = \delta_{opt} = 13.8° \Rightarrow \theta = 49.3412°$ (from (1))

$SPR_{DES} = 5.5529$ (from (21)):

so that:

$M_S = 1.2983 \Rightarrow \nu = 6.1248 \Rightarrow \delta_s = \delta_{eff} - \nu = 7.675°$ To apply this concept, a set of design conditions can be set and the inlet performance analyzed at off-design conditions to find an optimized compromise for a particular flight regime. So, for example, for a maximum inlet Mach number, $M_{0max} = 1.8$, total pressure recovery is maximized at $\delta_s = 7.68°$ and SPR=5.553. Recovery falls off, however, at other Mach numbers and SPRs. As a result, embodiments of the present disclosure can comprise a method for maximizing recovery at off-design conditions.

Example 6

The method can be analyzed for the case where $M_{0max} = 1.8$, but a supercruise Mach number, $M_{cruise} = 1.4$. From Table 2, and designing for the supercruise condition:

TABLE 3

| $M_{0_{DES}} = 1.4$ $\delta_s = 5.1°$ | | | |
|---|---|---|---|
| $M_0$ (—) | $SPR_{DES}$ (—) | Recovery (—) | $\Delta$ Recovery (—) |
| 1.3 | 2.762 | 0.9967 | −0.0005 |
| 1.4 | 3.1672 | 0.9932 | 0.0 |
| 1.5 | 3.644 | 0.9863 | −0.0002 |
| 1.6 | 4.2005 | 0.9759 | −0.0008 |
| 1.7 | 4.848 | 0.9622 | −0.0013 |
| 1.8 | 5.597 | 0.9451 | −0.0016 |

A compromise design can be chosen between supercruise and $M_{0max}$. Note, however, that a detached shock forms for $M_s>1$, which occurs in this example at $M_0=1.3$.

TABLE 4

$M_{0DES} = 1.6$ $\delta_c = 6.9°$

| $M_0$ (—) | $SPR_{DES}$ (—) | Recovery (—) | Δ Recovery (—) |
|---|---|---|---|
| 1.3 | — | — | — |
| 1.4 | 3.159 | 0.9922 | −0.0010 |
| 1.5 | 3.633 | 0.9863 | −0.0002 |
| 1.6 | 4.186 | 0.9767 | 0.0 |
| 1.7 | 4.827 | 0.9634 | −0.0001 |
| 1.8 | 5.567 | 0.9465 | −0.0002 |

Figure 5:
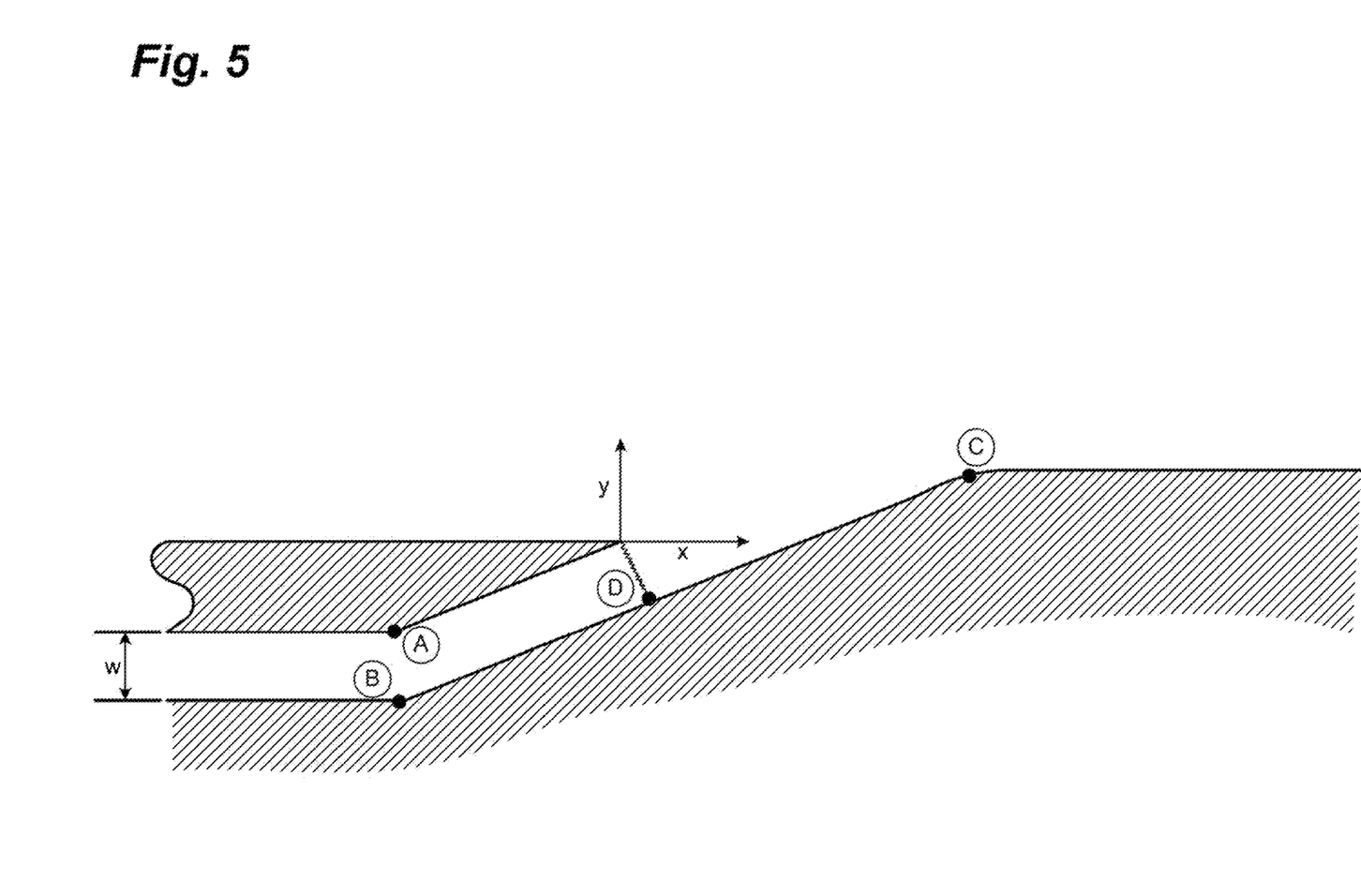
FIG. 5 is another view of the supersonic inlet of FIG. 1 with geometrical components, in accordance with some embodiments of the present disclosure.

The $M_0=1.6$ design can be further analyzed using the CFD computer program discussed earlier. The slot geometry can be chosen as shown in FIG. 5, where:

TABLE 5

| Point | x | y |
|---|---|---|
| A | $-x_0$ | $-x_0 \tan \delta_s$ |
| B | $-x_0 + w \sin \delta_s$ | $-x_0 \tan \delta_s - w \cos \delta_s$ |
| C | $\dfrac{w}{\sin \delta_s}$ | 0 |
| D | $w \sin \delta_s$ | $-w \cos \delta_s$ |

Thus, with $\delta_s=6.9°$:

TABLE 6

| | w = 1.0 | | w = 0.5 | |
|---|---|---|---|---|
| Point | x | y | x | y |
| A | −5 | −0.605066 | −5 | −.605066 |
| B | −4.879863 | −1.597824 | −4.39932 | −1.101445 |
| C | 8.323841 | 0 | 4.161921 | 0 |
| D | 0.120137 | −0.992757 | 0.060068 | −0.496379 |

Figure 6:
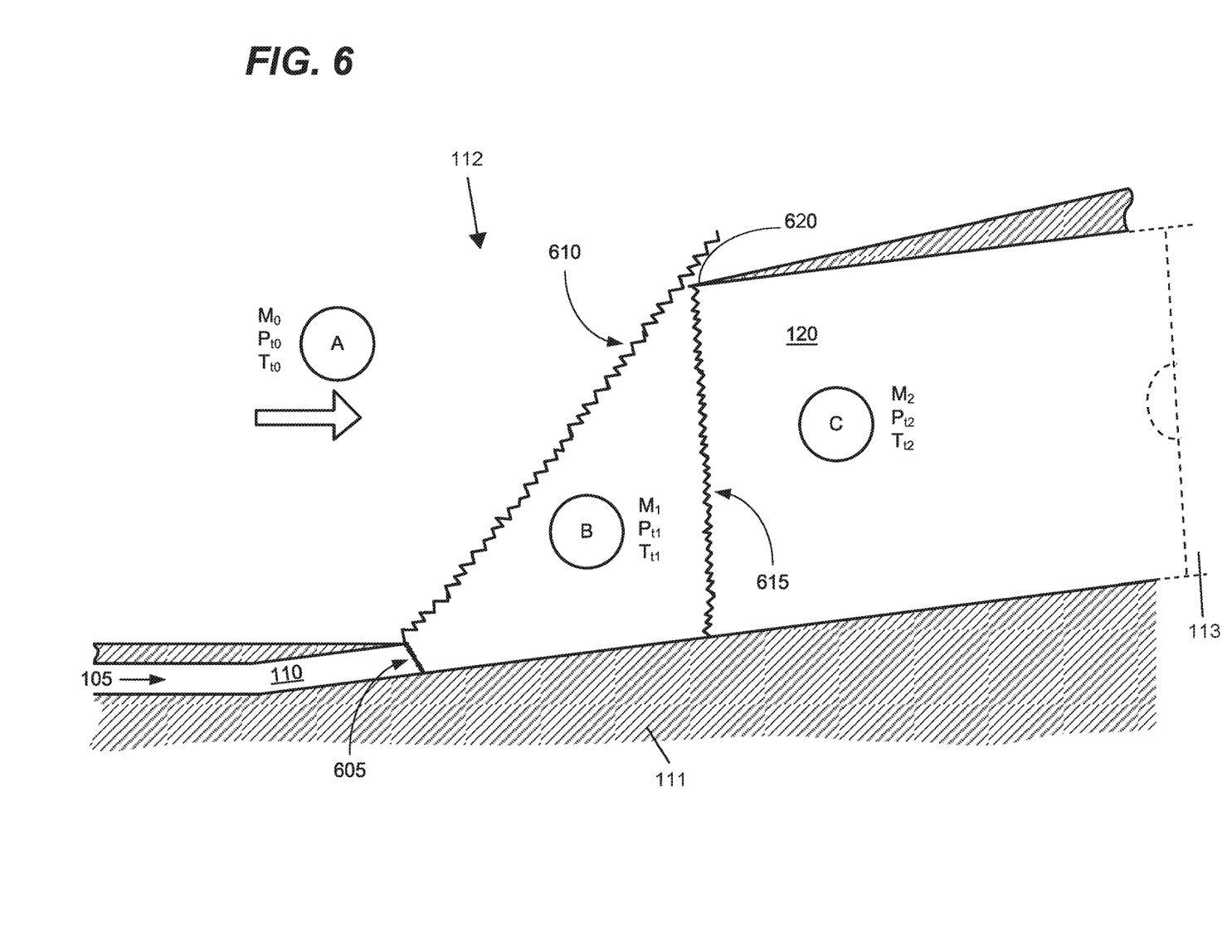
FIG. 6 is a depiction of a plurality of oblique shocks in a duct, based on computational fluid dynamic (CFD) analysis, in accordance with some embodiments of the present disclosure.

Using this information, a figure based on the CFD flow analysis is shown in FIG. 6 and in Table 7:

TABLE 7

| Condition (—) | $M_0$ (—) | SPR (—) | $\theta_{Meas}$ (degrees) | $\theta_{Cal}$ (degrees) |
|---|---|---|---|---|
| 1 | 1.6 | 4.186 | ~52 | 52.3 |
| 2 | 1.7 | 4.827 | 49 | 50.3 |
| 3 | 1.8 | 5.567 | 47.7 | 48.8 |
| 4 | 1.5 | 3.633 | 54.5 | 55.1 |
| 5 | 1.4 | 3.159 | 58.5 | 59 |
| 6 | 1.3 | 2.685 | 68.1 | — |
| 7 | 1.6 | 3.558 | 49.0 | 49.8 |
| 8 | 1.7 | 4.103 | 47.7 | 47.9 |
| 9 | 1.8 | 4.732 | 46.5 | 46.4 |
| 10 | 1.5 | 3.088 | 52.6 | 52.4 |
| 11 | 1.3 | 2.282 | — | — |
| 12 | 1.6 | 3.349 | 47.1 | 48.9 |
| 13 | 1.6 | 3.767 | 49.7 | 50.6 |

As shown, the shock wave angles from the CFD computer program are within a degree of the analytical results. As before, a detached shock forms at $M_0=1.3$, resulting in no solutions for these data points (i.e., conditions 6 and 11). As shown in FIG. 6, depending on the flow conditions, sonic flow 605 can be created in the throat of the slot 110 due to the high pressure air supply 105. In addition, the high pressure air 105 from the slot 110 can create an oblique shock 610, upstream of the duct 120 and outside the cowl lip, 620. Thus, in some embodiments, three main flow regions A, B, C can exist in the inlet system, where A represents that main incoming flow into the duct, at conditions $M_0$, $T_{t0}$, and $P_{t0}$, B represents the flow after passing through a first oblique shock 610—i.e., the shock shown in the upstream portion of the duct—at conditions $M_1$, $T_{t1}$, and $P_{t1}$, and C represents the flow after passing through the so-called "terminal normal shock" 615 at conditions $M_2$, $T_{t2}$, and $P_{t2}$, located in the downstream portion of the duct.

So, for example, as the main airflow enters the duct 120, it can pass through the first oblique shock 610. This slows the flow from $M_0$ to $M_1$, which could be, for example, from a high supersonic speed (e.g., M=1.6) to a low supersonic speed (e.g., M=1.2). The main airflow in the duct 120 can then pass through the terminal normal shock 615 to slow the flow from $M_1$ to $M_2$, which is a subsonic speed to enable proper engine function.

Figure 7A:
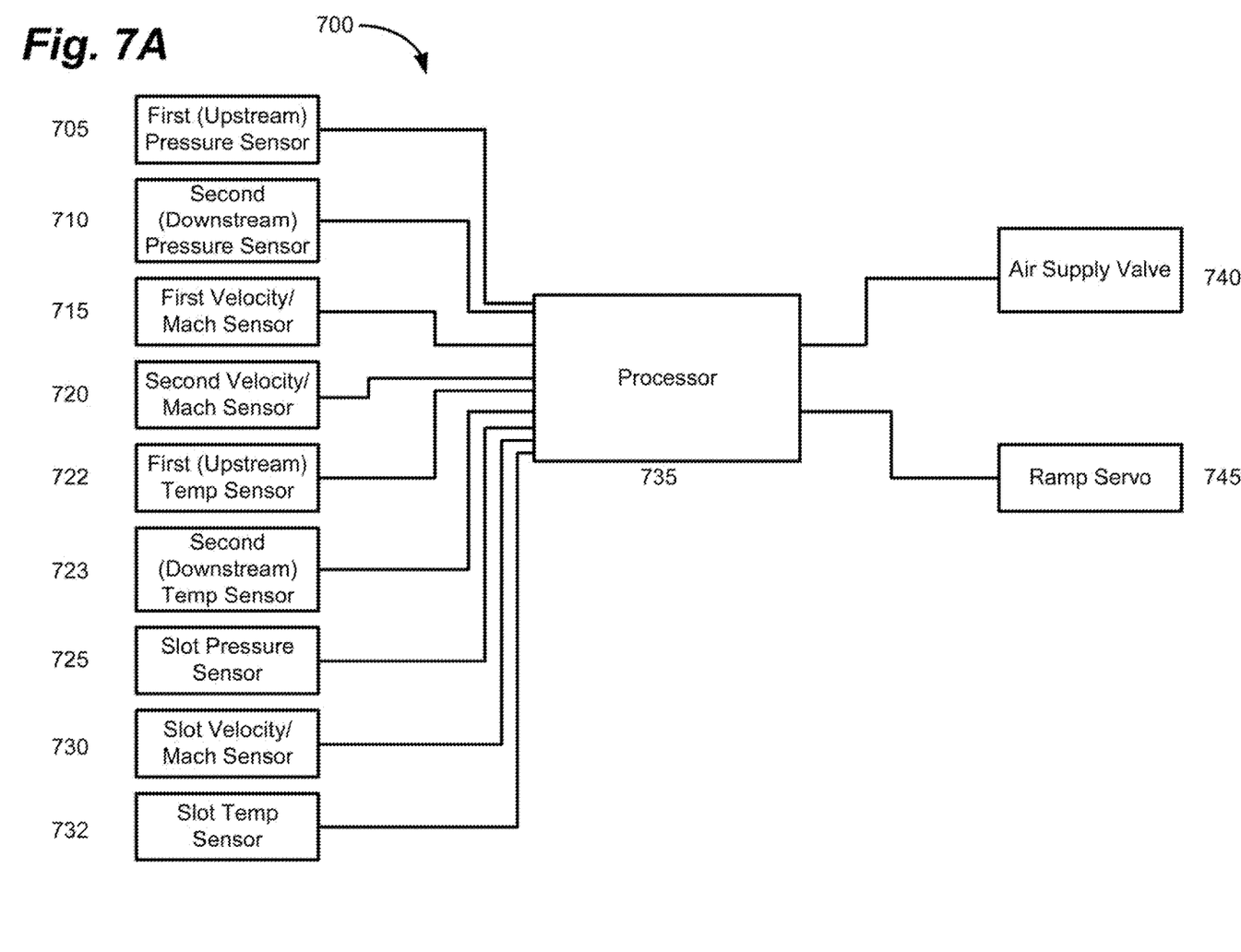
FIG. 7A is a system diagram for a system for controlling the SPR, in accordance with some embodiments of the present disclosure.
Figure 7B:
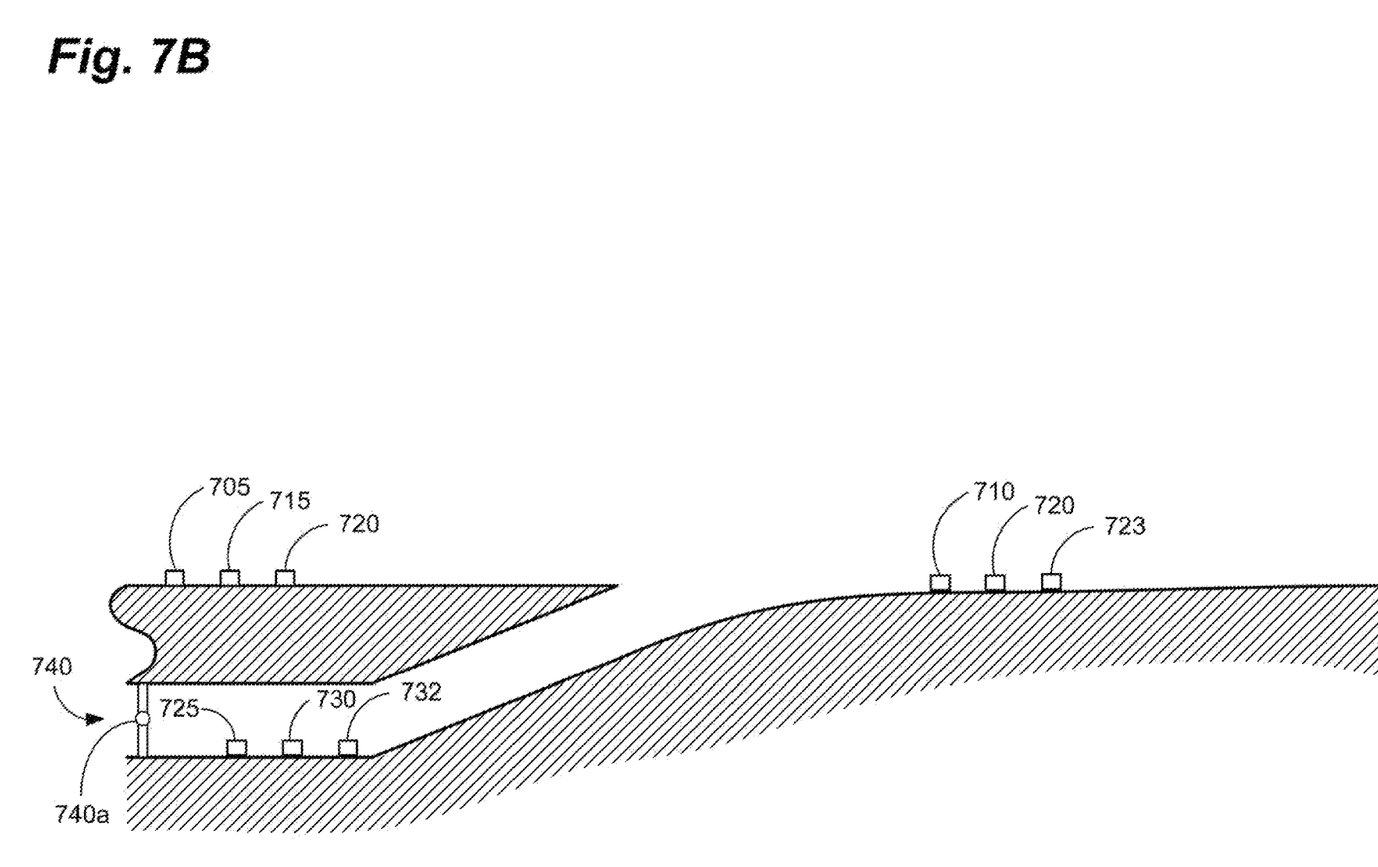
FIG. 7B is another view of the supersonic inlet of FIG. 1 with a plurality of sensors, in accordance with some embodiments of the present disclosure.

Embodiments of the present invention can also comprise a system 700 for controlling the SPR based on current conditions, as shown in FIGS. 7A and 7B. In some embodiments, the system 700 can comprise a processor 735 for receiving various inputs and providing various outputs. The processor 735 can comprise, for example and not limitation, a microprocessor, a PC, an application specific integrated circuit (ASIC), or a field programmable gate array (FPGA).

One of the inputs to the processor 735 can comprise one or more pressure sensors. In some embodiments, the system 700 can comprise, for example, an upstream pressure sensor 705 located upstream of the slot and a downstream pressure sensor 710 downstream of the slot. These pressure sensors 705, 710 can provide data related to the free stream air flow, including both the incoming air stream pressure, $P_{t0}$, and downstream air pressure, $P_{t1}$, to ensure sufficient diffusion is taken place through the shock. The pressure sensors 705, 710 can comprise, for example and not limitation, piezoresistive strain gauge, electromagnetic, capacitive, piezoelectric, or optical. The system 700 can also comprise one or more air stream velocity or Mach sensors. As with the pressure sensors 705, 710, the velocity sensors 715, 720 can comprise an upstream velocity sensor 715, to measure the velocity (or Mach number) of the flow prior to the slot, and a downstream velocity sensor 720, to measure the velocity (or Mach number) of the flow after the slot. The velocity sensors can comprise a variety of pitot-static sensors known in the art.

Similarly, the system 700 can also comprise one or more temperature sensors instead of, or in addition to, the Mach sensors 715. The system 700 can include, for example, an upstream temperature sensor 722 for measuring the temperature of the incoming air stream ($P_{t0}$). In some embodiments, the system 700 can also comprise a downstream temperature sensor 723 for measuring the temperature of the flow after the slot ($P_{t1}$).

The system 700 can also comprise one or more additional pressure and/or velocity sensors located in the slot 110. In some embodiments, the system 700 can comprise a slot pressure sensor 725 located in the slot, which can be used in the calculation of the SPR. In some embodiments, the system 700 can also comprise a slot velocity or Mach sensor 730 in the slot to ensure, for example, that the slot is choked when desired. In some embodiments, the system 700 can also comprise a slot temperature sensor 732 to measure the temperature of the air flow through the slot 110.

The system 700 can use these inputs to calculate the SPR required for efficient diffusion at current flight conditions. In some embodiments, the processor 735 can calculate the desired SPR in real-time using the formulas discussed above. In other embodiments, the processor 735 can refer to a multi-dimensional map, similar to those used in automotive engine management, or a table to look up an appropriate SPR, or estimated SPR, for current conditions. The processor 735 can then vary the air supply valve 740 to provide the necessary amount of bleed air for the predetermined SPR. The processor 735 can vary the valve constantly, or at a predetermined interval (e.g., once per second) based on feedback from the various sensors, for example, to maintain the desired SPR.

In some embodiments, rather the system 700 can comprise a fixed orifice disposed in the duct such that the necessary amount of bleed air can be provided to the slot. In some embodiments, the orifice can be determined for a cruise Mach number, for example. In other words, the orifice can be set to provide $SPR_{des}$ at $M_{cruise}$. In this configuration, the system 700 can provide additional reliability and reduced weight and complexity, at the expense of some flexibility in operation.

The sensors can be used for feedback and to detect faults. If for example, the air supply valve 740 has malfunctioned or failed, a comparison between an air valve position sensor 740a, for example, and the pressure sensor 725 or Mach/velocity sensor 730 in the slot 110 can enable diagnosis of this problem. If, on the other hand, a particular SPR does not provide the desired conditions (e.g., $M_1$, $P_{t1}$, and $T_{t1}$) after the slot, the system 700 can reposition the valve 740 and, in some cases, update a data table or calculation, for example, for future reference.

In some embodiments, the system 700 can also comprise a variable slot with one or more adjustable ramps. As a result, in some embodiments, the processor 735 can also command a ramp control servo 745 to move the ramp(s) up or down based on current air flow conditions.

Figure 8:
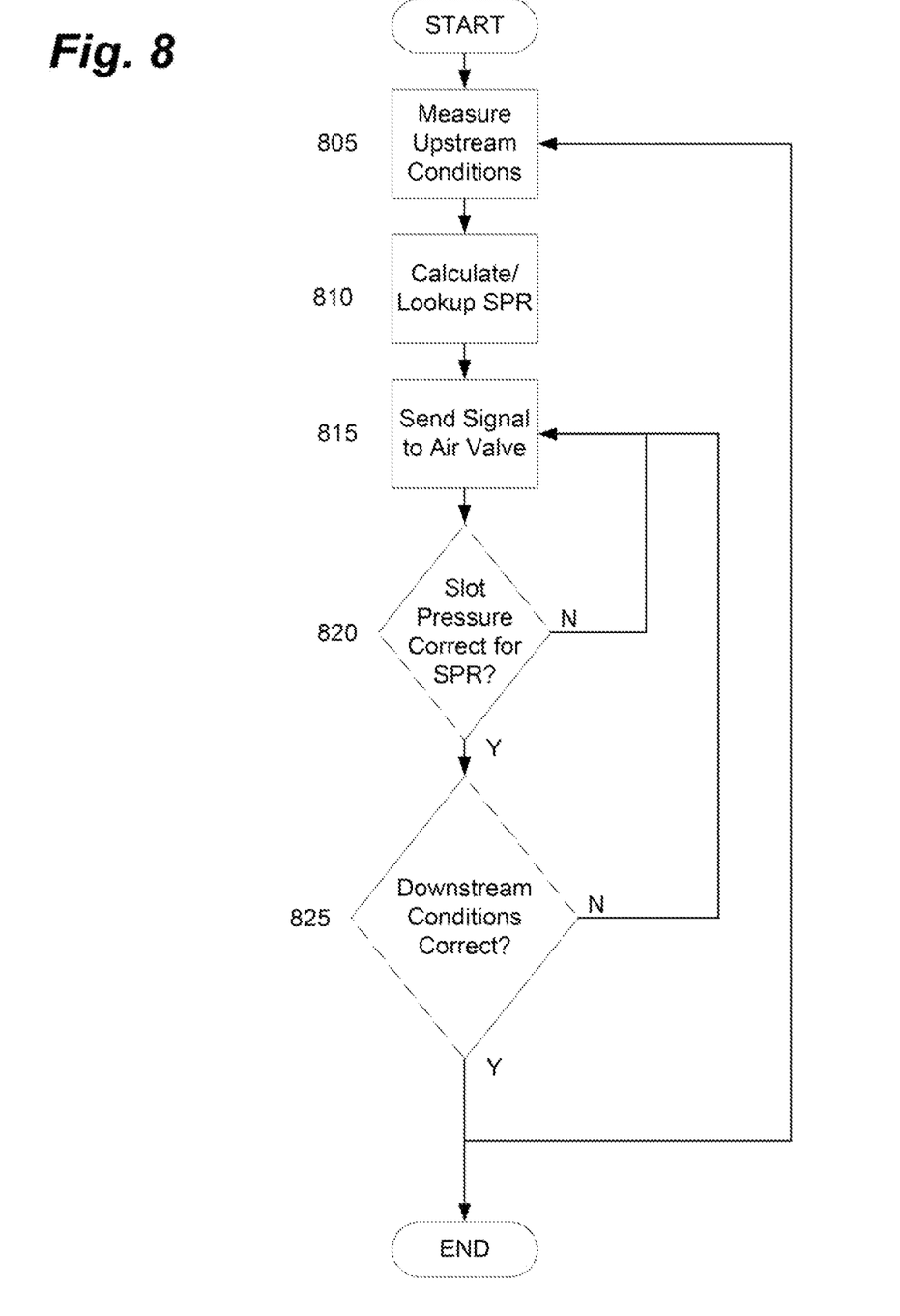
FIG. 8 is a flowchart depicting a method for controlling the SPR in the slot, in accordance with some embodiments of the present disclosure.

As shown in FIG. 8, embodiments of the present disclosure can also comprise a method 800 for controlling the slot pressure ratio in a variable supersonic inlet. In some embodiments, the method 800 can comprise measuring 805 the inlet, or free stream, air stream conditions (e.g., $M_0$, $P_{t0}$, and $T_{t0}$). The method 800 can then calculate the desired SPR based on the air stream conditions, as shown at 810. In some embodiments, this can be done in real time using a processor and the necessary formulas, as discussed above. In other embodiments, the processor can look up the SPR in a multidimensional map or table including a plurality of air stream conditions. The processor can then send a control signal to an air control valve to provide bleed air at a predetermined pressure related to the desired SPR, as shown at 815.

In some embodiments, the method 800 can further comprise one or more feedback loops to ensure the system is providing the proper SPR. In some embodiments, the method 800 can include checking the slot pressure using one or more pressure sensors in the slot, as shown at 820. If the slot pressure is too low, for example, the processor can send a signal to the air control valve to open further. In some embodiments, the method 800 can also include a comparison between the upstream conditions (e.g., $M_0$, $P_{t0}$, and $T_{t0}$) and the downstream conditions (e.g., $M_1$, $Pt_1$, and $T_{t1}$), as shown at 825. If the downstream velocity sensor indicates that the main flow has not been sufficiently slowed (i.e., diffused), the processor can send a signal to the air control valve to open to increase the SPR (and thus, the strength of the shock). In some embodiments, the method can end when the aircraft goes subsonic, for example, or goes below a specific subsonic speed.

While several possible embodiments are disclosed above, embodiments of the present disclosure are not so limited. For instance, while a computer controlled robotic arm has been disclosed, other suitable machines, such as a mobile robotic vehicle, for example, could be selected without departing from the spirit of the disclosure. In addition, the location and configuration used for various features of embodiments of the present disclosure such as, for example, the location of motors, sensors, and other components can be varied according to a particular aircraft or application that requires a slight variation due to, for example, the size or construction of the aircraft, the type of robot or tooling required, or weight or power constraints. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed embodiments, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A variable supersonic inlet system for an air-breathing engine comprising:
   a cowl lip;
   a surface spatially separated from the cowl lip to define a duct therebetween, the duct having an upstream end proximate, and downstream of, a free stream air flow and a downstream end proximate, and upstream of, the air-breathing engine, the surface having one or more slots disposed therethrough and upstream of the duct;
   a pressurized air source for expulsion of pressurized air through the one or more slots into the free stream air flow;
   at least one slot sensor disposed within the one or more slots to measure at least one slot condition;
   at least one downstream sensor disposed downstream of the one or more slots to measure at least one downstream condition;
   at least one upstream sensor disposed upstream of the one or more slots to measure at least one upstream condition;
   wherein the pressurized air creates one or more oblique shock waves upstream of the duct to slow the free stream air flow from a supersonic speed to a subsonic speed prior to the air-breathing engine; and
   a valve disposed in the one or more slots for metering a flow from the pressurized air source through the one or more slots based on the at least one slot condition, the at least one downstream condition, and the at least one upstream condition; and
   a processor operatively connected to the at least one slot sensor, the at least one downstream sensor, the at least one upstream sensor, and the valve, the processor configured to:
      determine a slot pressure ratio (SPR) based on the at least one slot condition, the at least one downstream condition, and the at least one upstream condition; and control the valve to provide the pressurized air based on at least the SPR to the one or more slots to generate the one or more oblique shock waves.

2. The variable supersonic inlet system of claim 1, wherein the pressurized air source comprises bleed air from a compressor stage of the air-breathing engine.

3. The variable supersonic inlet system of claim 1, wherein the one or more slots are disposed at an oblique angle from a horizontal axis of the duct.

4. The variable supersonic inlet system of claim 3, wherein the oblique angle is between 3 degrees and 12 degrees.

5. The variable supersonic inlet system of claim 4, wherein the oblique angle is between 3.5 degrees and 8 degrees.

6. The variable supersonic inlet system of claim 1, further comprising: a ramp servo of the one or more slots to control an adjustable ramp to vary the one or more slots based on current flight conditions.

7. The variable supersonic inlet system of claim 1, wherein the processor is further configured to determine the SPR based on the at least one slot condition, the at least one upstream condition, the at least one downstream condition, and a multidimensional map corresponding to a plurality of air stream conditions.

8. A system for generating one or more oblique shock waves, the system comprising:
 an air-breathing engine;
 a variable supersonic inlet having a duct between a cowl lip and a surface spatially separated from the cowl lip, the duct having an upstream end proximate, and downstream of, a free stream air flow and a downstream end proximate, and upstream of, the air breathing engine, the surface having one or more slots disposed therethrough and upstream of the duct;
 at least one slot sensor disposed within the one or more slots to measure at least one slot condition;
 at least one upstream sensor disposed upstream of the one or more slots to measure at least one upstream condition;
 at least one downstream sensor disposed downstream of the one or more slots to measure at least one downstream condition;
 a pressurized air source for expulsion of pressurized air through the one or more slots into the free stream air flow;
 a valve disposed in the one or more slots for metering a flow from the pressurized air source through the one or more slots;
 a processor operatively connected to the at least one slot sensor, the at least one upstream sensor, the at least one downstream sensor, and the valve, the processor configured to:
  determine a slot pressure ratio (SPR) based on the at least one slot condition, the at least one downstream condition, and the at least one upstream condition; and
  control the valve to provide the pressurized air based on at least the SPR to the one or more slots to generate the one or more oblique shock waves upstream of the duct to decelerate the free stream air flow from a supersonic speed to a subsonic speed prior to the air-breathing engine.

9. The system of claim 8, wherein the processor is further configured to determine the SPR based on the at least one slot condition, the at least one upstream condition, the at least one downstream condition, and a multidimensional map corresponding to a plurality of air stream conditions.

10. The system of claim 8, wherein the processor is further configured to:
 determine a minimum slot pressure ratio (SPR*), wherein the SPR* is a minimum slot pressure ratio required in the one or more slots to produce the one or more oblique shock waves in the variable supersonic inlet;
 determine a maximum slot pressure ratio ($SPR_{max}$), wherein the $SPR_{max}$ is the slot pressure ratio at which the one or more oblique shock waves will detach from the variable supersonic inlet; and
 control the valve to provide the pressurized air to a first end of the one or more slots at a first pressure that is between the SPR* and the $SPR_{max}$.

11. The system of claim 8, wherein the pressurized air source comprises bleed air from a compressor stage of the air-breathing engine.

12. The system of claim 8, wherein the processor is further configured to:
 determine a cruise effective ramp angle ($\delta_{cruise}$) for the variable supersonic inlet for a first predetermined Mach number ($M_{cruise}$);
 determining a first slot angle ($\delta_{scruise}$) for the one or more slots in communication with the variable supersonic inlet at the $M_{cruise}$; and
 determine a cruise slot pressure ratio ($SPR_{cruise}$) at which the one or more oblique shock waves will form in the variable supersonic inlet and a Mach number ($M_1$) of an air flow in the variable supersonic inlet after the one or more oblique shock waves is approximately equal to a Mach number ($M_s$) of a flow in the one or more slots.

13. The system of claim 12, wherein the processor is further configured to:
 determine a maximum effective ramp angle ($S_{max}$) for the one or more slots for a second predetermined Mach number ($M_{max}$);
 determining a second slot angle ($S_{smax}$) for the slot at the $M_{max}$; and
 determining a maximum slot pressure ratio ($SPR_{max}$) at which:
  the one or more oblique shock waves will detach from the variable supersonic inlet.

14. The system of claim 13, wherein the processor is further configured to:
 determine a third effective ramp angle ($\delta_{opt}$) for the one or more slots in the variable supersonic inlet for a third predetermined Mach number ($M_{opt}$);
 determine a third slot angle ($\delta_{sopt}$) for the slot at the $M_{opt}$;
 determine a third slot pressure ratio ($SPR_{opt}$) at which the one or more oblique shock waves will form in the variable supersonic inlet and the Mach number ($M_1$) of the free stream air flow in the variable supersonic inlet after the one or more oblique shock waves is approximately equal to a Mach number ($M_s$) of the flow of the pressurized air in the slot; one or more slots;
 wherein the $\delta_{opt}$ is between the $\delta_{cruise}$ and the $\delta_{max}$;
 wherein the $\delta_{sopt}$ is between the $\delta_{scruise}$ and the $\delta_{smax}$;
 wherein the $SPR_{opt}$ is between the $SPR_{cruise}$ and the $SPR_{max}$; and
 wherein the $\delta_{opt}$ provides maximum system recovery for effective ramp angles between the $\delta_{cruise}$ and the $\delta_{max}$.

15. The system of claim 8, wherein the one or more slots are disposed at an oblique angle from a horizontal axis of the duct.

16. The system of claim 15, wherein the oblique angle is between 3 degrees and 12 degrees.

17. A system for decelerating a main air flow in a supersonic inlet of an air-breathing engine, the system comprising:
- a variable supersonic inlet having a duct between a cowl lip and a surface spatially separated from the cowl lip, the duct having an upstream end proximate, and downstream of, a free stream air flow and a downstream end proximate, and upstream of, the air-breathing engine;
- a variable slot disposed through the surface and upstream from the duct, the variable slot having an adjustable ramp to vary the variable slot;
- at least one slot sensor disposed within the variable slot to measure at least one slot condition;
- at least one upstream sensor disposed upstream of the variable slot to measure at least one upstream condition;
- at least one downstream sensor disposed downstream of the variable slot to measure at least one downstream condition;
- a pressurized air source for expulsion of pressurized air through the variable slot into the free stream air flow;
- a valve disposed in the variable slot for metering a flow from the pressurized air source through the variable slot;
- a ramp servo of the variable slot to control an adjustable ramp to vary the variable slot;
- a processor operatively connected to the at least one slot sensor, the at least one upstream sensor, the at least one downstream sensor, the ramp servo, and the valve, the processor configured to:
  - determine a desired slot pressure ratio (SPR) based on the at least one slot condition, the at least one upstream condition, and the at least one downstream condition;
  - control the valve and the ramp servo to maintain the desired SPR to generate one or more oblique shock waves upstream of the duct to decelerate the free stream air flow from a supersonic speed to a subsonic speed prior to the air breathing engine.

18. The system of claim 17, wherein the processor is further configured to determine the desired SPR based on the at least one slot condition, the at least one upstream condition, the at least one downstream condition, and a multidimensional map corresponding to a plurality of air stream conditions.

19. The system of claim 17, wherein the processor is further configured to:
- determine a minimum slot pressure ratio (SPR*), wherein the SPR* is a minimum slot pressure ratio required in the one or more slots to produce the one or more oblique shock waves in the variable supersonic inlet;
- determine a maximum slot pressure ratio ($SPR_{max}$), wherein the $SPR_{max}$ is the slot pressure ratio at which the one or more oblique shock waves will detach from the variable supersonic inlet; and
- control the valve to provide pressurized air to a first end of the one or more slots at a first pressure that is between SPR* and $SPR_{max}$.

20. The system of claim 17, wherein the pressurized air source comprises bleed air from a compressor stage of the air-breathing engine.

* * * * *